United States Patent
Liberg et al.

(10) Patent No.: US 11,026,161 B2
(45) Date of Patent: Jun. 1, 2021

(54) METHOD AND APPARATUS FOR CONTROLLING A RADIO ACCESS CONNECTION TO A TELECOMMUNICATIONS NETWORK

(71) Applicant: Telefonaktiebolaget LM Ericsson (publ), Stockholm (SE)

(72) Inventors: Olof Liberg, Stockholm (SE); Mårten Sundberg, Årsta (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/463,480

(22) PCT Filed: Nov. 25, 2016

(86) PCT No.: PCT/EP2016/078890
§ 371 (c)(1),
(2) Date: May 23, 2019

(87) PCT Pub. No.: WO2018/095542
PCT Pub. Date: May 31, 2018

(65) Prior Publication Data
US 2019/0364489 A1     Nov. 28, 2019

(51) Int. Cl.
*H04W 48/12* (2009.01)
*H04B 17/318* (2015.01)
(Continued)

(52) U.S. Cl.
CPC .......... *H04W 48/12* (2013.01); *H04B 17/318* (2015.01); *H04L 1/1614* (2013.01); *H04W 24/10* (2013.01)

(58) Field of Classification Search
CPC ..... H04W 48/12; H04W 24/10; H04W 48/18; H04W 48/06; H04W 84/04; H04W 74/00;
(Continued)

(56) References Cited

U.S. PATENT DOCUMENTS

2013/0170479 A1    7/2013  Fong et al.
2013/0215742 A1*   8/2013  Sirotkin ............ H04W 28/0247
                                                    370/230
(Continued)

FOREIGN PATENT DOCUMENTS

CN    102905389 A    1/2013
CN    103096416 A    5/2013
(Continued)

OTHER PUBLICATIONS

ZTE ("Extended Access Barring for delay tolerant devices", 3GPP TSG-RAN WG2 meeting #73bis, R2-111918, Apr. 11-15, 2011) (Year: 2011).*

(Continued)

*Primary Examiner* — Chi H Pham
*Assistant Examiner* — Ji-Hae Yea
(74) *Attorney, Agent, or Firm* — Baker Botts, LLP

(57) ABSTRACT

Methods and apparatus are proposed for controlling a radio access network connection to a telecommunications network. In order to enable resource based access barring a wireless terminal performs a delay in proceeding with a radio network access procedure based on an obtained indication of access barring. The access barring is a resource based access barring; based on the resource usage of a wireless terminal.

14 Claims, 10 Drawing Sheets

(51) Int. Cl.
  *H04L 1/16*    (2006.01)
  *H04W 24/10*   (2009.01)
(58) Field of Classification Search
  CPC ..... H04W 48/10; H04W 28/02; H04W 72/04; H04W 72/0446; H04W 28/0205; H04B 17/318; H04L 1/1614
  See application file for complete search history.

(56) References Cited

U.S. PATENT DOCUMENTS

2014/0120938 A1*  5/2014  Widell ............... H04W 48/02
                                                       455/453
2014/0171061 A1*  6/2014  Larmo ............... H04W 74/006
                                                      455/422.1

FOREIGN PATENT DOCUMENTS

| CN | 103096418 A    | 5/2013 |
| EP | 2 879 437 A1   | 6/2015 |
| WO | 2013 025148 A1 | 2/2013 |
| WO | 2016 122830 A1 | 8/2016 |

OTHER PUBLICATIONS

Qualcomm ("EAB mechanism for RAN overload control in UMTS", 3GPP TSG-RAN WG2 Meeting #75, R2-114159, Aug. 22-26, 2011) (Year: 2011).*
Ericsson, ST-Ericsson ("Extended access barring mechanism for MTC devices", 3GPP TSG-RAN WG2 #75-bis, Tdoc R2-115086, Oct. 10-14, 2011) (Year: 2011).*
3GPP TSG-RAN WG2 #75-bis; Zhuhai, China; Source: Ericsson, ST-Ericsson; Title: Extended access barring mechanism for MTC devices (Tdoc R2-115086)—Oct. 10-14, 2011.
3GPP TSG-RAN WG2 Meeting #75bis; Zhuhai, China; Source: Alcatel-Lucent, Alcatel-Lucent Shanghai Bell; Title: Consider some issues for EAB (R2-115215)—Oct. 10-15, 2011.
International Search Report for international application No. PCT/EP2018/078890—dated Aug. 11, 2017.
Chinese Office Action issued for Application No. 201680092049.1—dated Dec. 1, 2020.
Chinese Search Report issued for Application No. 2016800920491—dated Nov. 24, 2020.
Brazilian Office Action issued for Patent Application No. BR112019010469-0—dated Sep. 3, 2020.
Notice of Reasons for Rejection issued by the Japan Patent Office for Patent Application No. 2019-528105—dated Jun. 22, 2020.
3GPP TSG-RAN WG2 Meeting #95; Gothenburg, Sweden; Source: ZTE; Title: Consideration for PRACH on multi-carrier in Nb-IoT (R2-164859)—Aug. 22-26, 2016.
3GPP TSG-RAN WG2 #95; Gothenburg, Sweden; Source: Sequans Communications; Title: NPRACH on a non-anchor carrier (R2-165554)—Aug. 22-26, 2016.
3GPP TSG-RAN WG2 #95bis; Kaohsiung, Taiwan; Source: Sequans Communications; Title: NPRACH on a non-anchor carrier (R2-167103)—Oct. 10-14, 2016.

* cited by examiner

900 Wireless Terminal

Figure 9

1000 Radio Network Node

Figure 10

METHOD AND APPARATUS FOR CONTROLLING A RADIO ACCESS CONNECTION TO A TELECOMMUNICATIONS NETWORK

PRIORITY

This nonprovisional application is a U.S. National Stage Filing under 35 U.S.C. § 371 of International Patent Application Serial No. PCT/EP2016/078890 filed Nov. 25, 2016 and entitled "Method and Apparatus for Controlling a Radio Access Connection to a Telecommunications Network" which is hereby incorporated by reference in its entirety.

TECHNICAL FIELD

The present application relates to a method and apparatus for deferring a network access procedure for connecting to a telecommunications network.

BACKGROUND

3GPP Release 13 introduced a new radio access technology denoted Narrowband Internet of Things (NB-IoT) intended to provide machine to machine type connectivity. In the same release Long Term Evolution (LTE) enhancements intended for machine-type communications (eMTC) including a bandwidth-reduced low-complexity (BL) User Equipment (UE) type was specified (UE Category M1). Also for GSM a new solution named EC-GSM-IoT was specified with the purpose to serve Internet of Things (IoT) types of traffic. An NB-IoT device or MTC device which connects to a telecommunications network via radio transmissions may be considered to comprise a wireless terminal; herein, reference to a wireless terminal shall include any NB-IoT device or MTC device unless explicitly stated to the contrary.

Common to the above mentioned solutions is that they were designed to cater for services characterised by requirements on extended radio coverage range, long battery life, low complexity as well as short data transfers. The main technology used by these solutions to facilitate extended coverage is repetition based transmission schemes, also commonly referred to as blind repetitions in the EC-GSM-IoT 3GPP specifications, or just repetitions in the NB-IoT and LTE 3GPP specifications.

It is expected that the number of IoT devices will grow exponentially. NB-IoT, LTE and EC-GSM-IoT have been specified to support Extended Access Class Barring (EAB) functionality where each device is associated with one out of 10 access classes, and one out of 5 special access classes. The network can, at any time, choose to bar the devices in a certain access class from making a system access. The network indicates this via a bit map signaled in the system information.

Extended Access class Barring (EAB) is a coarse mechanism that bars all devices in a certain access class. It does not consider the impact from a certain device on the radio access network load nor does it take the radio interface characteristics into account.

The technologies listed above (e.g. eMTC, NB-IoT, EC-GSM-IoT), introduce blind repetitions to deal with users being in a challenging coverage scenario. Repetitions of the same transport block is transmitted (without a negative acknowledgement from the receiver) for the receiver to combine them, providing processing gain. From a network perspective, these devices will typically not cause a disproportionate amount of network interference since the devices are in a challenging coverage scenario (i.e. the signal level received at the serving cell is low), but they will consume a disproportionate amount of resources that typically cannot be used by other devices. This can lead rapidly to a network congestion situation.

In U.S. Pat. No. 9,462,611 it is proposed to focus on the transmit data buffer of a UE, meaning that a barring condition occurs based on how much data a UE would like to transmit. This method does not, however, consider the user equipment which only requires to transmit a small amount of data but is a low power device and/or is in challenging radio conditions.

It is an object of the present disclosure to provide methods and devices that enable improved radio access control including improved access barring techniques.

SUMMARY

The above object and further objects achieved according to a first embodiment in a method in a wireless terminal for performing a radio network access procedure, the method comprising performing a delay in proceeding with a radio network access procedure based on an obtained indication of access barring, wherein the access barring is based on a radio resource usage of the wireless terminal. The method provides the advantage that a wireless terminal which would use a large amount of resources, for example due to being in extended coverage, refrains from accessing the radio network thus allowing other wireless terminals with better coverage and therefore lower resource consumption to access the radio network. Additionally this allows the indication of access barring to be specific to wireless terminals which consume high amounts of resources rather than being a more random barring which would prevent access to the radio network by wireless terminals which have good coverage and therefore would not produce a high amount of load.

In a further aspect of the first embodiment, the indication of access barring comprises one or more of a resource based access barring flag, a resource based access barring bitmap, a coverage class level, or a transmission mode. The indication may be defined in a simple form to indicate that any wireless terminal in extended coverage is barred from system access. Alternatively a structured level of barring is achieved via a bitmap which provides the benefit of, for example, indicating one or more specific coverage classes as being barred. Different types of wireless terminal and wireless terminals in different situations may determine the coverage class to which they belong or are assigned. In other examples the wireless terminals have a particular transmission mode for which the barring is indicated.

In a further aspect of the first embodiment, the transmission mode is one or more of a coverage mode or a power mode. This provides the benefit of separately barring wireless terminals of a certain power class, e.g. low power devices and/or wireless terminals operating in extended or extreme coverage modes for example in a building basement.

In a further aspect of the first embodiment, the radio resource usage comprises the wireless access terminal performing blind repetitions, repetitions, or re-transmission of transmissions to a radio network node.

In a further aspect of the first embodiment, the wireless terminal determines the radio resource usage based on estimated cell signal strength and/or quality and radio resource usage thresholds. This provides the advantage that the wireless terminal is able to determine its radio resource usage dynamically and as result base its decision whether to perform a delay in proceeding with a radio network access procedure as a result of the determination.

In a further aspect of the first embodiment, the indication of access barring comprises a plurality of resource based access class barring flags or bitmaps, wherein each flag or bitmap corresponds to a radio resource usage indication.

In a further aspect of the first embodiment, the wireless terminal is configured with an Extended Access-class Barring (EAB) value and the indication of access barring indicates, for a given radio resource usage indication, an Extended Access-class Barring (EAB) value for which resource based access barring applies. This provides the advantage that the method enhances the EAB solution and therefore is not in conflict with such a system.

In a further aspect of the first embodiment, the wireless terminal performs a delay in proceeding with a radio network access procedure until a specified time period has elapsed, wherein the specified time period is based either on a random period or derived from a number of consecutive access attempts. This provides the advantage that if multiple wireless terminals attempt connection to a radio access and are barred, the during in which they will wait before retrying will be randomly distributed or will increase each time they re-try and thus improve the recovery of the cell to support further access attempts.

In a second embodiment a method in a radio network node for controlling access to the radio network node is provided, the method comprises providing an indication of access barring for a radio network node, wherein the access barring is based on the radio resource usage of a wireless terminal. This provides the advantage that a radio network node which serves a cell with high signalling load can selectively bar certain wireless terminals based on the radio resources they would use in trying to access the radio network. This provides an improvement over EAB which only bars devices based on the randomly allocated access class and not in relation the resources they would use.

In a further aspect of the second embodiment, the indication of access barring comprises one or more of a resource based access barring flag, a resource based access barring bitmap, a coverage class level or a transmission mode.

In a further aspect of the second embodiment, the transmission mode is one or more of a coverage mode or a power mode.

In a further aspect of the second embodiment, providing an indication of access barring is signalled by the radio network node to the wireless terminal in one or more of: a synchronisation signal; a system information broadcast signal; a master information broadcast signal; or a message carried by a common or dedicated control channel.

In a further aspect of the second embodiment, the radio network node provides a time period in which the wireless terminal performs a delay in proceeding with a radio network access procedure, wherein the time period is randomly generated.

In a third embodiment a wireless terminal is provided wherein the wireless terminal is configured to delay proceeding with a radio network access procedure based on an obtained indication of access barring, wherein the access barring is based on a radio resource usage of the wireless terminal.

In a further aspect of the third embodiment, the indication of access barring comprises one or more of a resource based access barring flag, resource bases access barring bitmap, a coverage class level, or a transmission mode.

In a further aspect of the third embodiment, the transmission mode is one or more of a coverage mode or a power mode.

In a further aspect of the third embodiment, the radio resource usage comprises the wireless access terminal performing blind repetitions, repetitions, or re-transmission of transmissions to a radio network node.

In a further aspect of the third embodiment, the wireless terminal is configured to determine the radio resource usage based on estimated cell signal strength and/or quality and radio resource usage thresholds.

In a further aspect of the third embodiment, the indication of access barring comprises a plurality of resource based access class barring flags or bitmaps, wherein each flag or bitmap corresponds to a radio resource usage indication.

In a further aspect of the third embodiment, the wireless terminal is configured with an Extended Access-class Barring (EAB) value and the indication of access barring indicates, for a given radio resource usage indication, an Extended Access-class Barring (EAB) value for which resource based access barring applies.

In a further aspect of the third embodiment, the wireless terminal is configured to perform a delay in proceeding with a radio network access procedure until a specified time period has elapsed, wherein the specified time period is based either on a random period or derived from a number of consecutive access attempts.

In a fourth embodiment a radio network node is provided wherein the radio network node is configured to provide an indication of access barring for a radio network node, wherein the access barring is based on the radio resource usage of a wireless terminal.

In a further aspect of the fourth embodiment, the indication of access barring comprises one or more of a resource based access barring flag, a resource based access barring bitmap, a coverage class level, or a transmission mode.

In a further aspect of the fourth embodiment, the transmission mode is one or more of a coverage mode or a power mode.

In a further aspect of the fourth embodiment, the radio network node is further configured to provide a time period in which the wireless terminal delays proceeding with a radio network access procedure, wherein the time period is randomly generated.

In a further aspect of the fourth embodiment, the radio network node is configured to signal the indication of access barring in one or more of a synchronisation signal, a system information broadcast signal a master information broadcast signal or a message carried by a common or dedicated control channel.

In a fifth embodiment a wireless terminal is provided, comprising processor circuitry, a memory and transceiver circuitry. The memory contains instructions executable by said processor circuitry and the wireless terminal is operative to receive, via said transceiver circuitry, an indication of access barring for a radio network node, wherein the barring is based on the radio resource usage of a wireless terminal and said processor circuitry is configured to determine the radio resource usage of the wireless terminal and perform a delay in proceeding with a radio network access procedure with the radio network node based on the indication of access barring and the determined radio resource usage.

In a further aspect of the fifth embodiment, the indication of access barring comprises one or more of a resource based access barring flag, a resource based access barring bitmap, a coverage class level, or a transmission mode.

In a further aspect of the fifth embodiment, the transmission mode is one or more of a coverage mode or a power mode.

In a further aspect of the fifth embodiment, the radio resource usage comprises the wireless access terminal performing blind repetitions, repetitions, or re-transmission of transmissions to a radio network node.

In a further aspect of the fifth embodiment, the processor circuitry is configured to determine the radio resource usage based on estimated cell signal strength and/or quality and radio resource usage thresholds.

In a further aspect of the fifth embodiment, the indication of access barring comprises a plurality of resource based access class barring flags or bitmaps, wherein each flag or bitmap corresponds to a radio resource usage indication.

In a further aspect of the fifth embodiment, the wireless terminal is configured with an Extended Access-class Barring (EAB) value and the indication of access barring indicates, for a given radio resource usage indication, an Extended Access-class Barring (EAB) value for which resource based access barring applies.

In a further aspect of the fifth embodiment, the processor circuitry is configured to perform a delay in proceeding with a radio network access procedure until a specified time period has elapsed, wherein the specified time period is based either on a random period or derived from a number of consecutive access attempts.

In a sixth embodiment, a radio network node in a telecommunications system is provided, the radio network node comprising a memory, processor circuitry and transceiver circuitry. The memory contains instructions executable by said processor circuitry, whereby said radio network node is operative to provide, via said transceiver circuitry, an indication of access barring for a radio network node, wherein the barring is based on the radio resource usage of a wireless terminal.

In a further aspect of the sixth embodiment, the transceiver circuitry is further configured to provide a time period in which the wireless terminal performs a delay in proceeding with a radio network access procedure, wherein the time period is randomly generated.

In a further aspect of the sixth embodiment, the transceiver circuitry (1203) is further configured to signal the indication of access barring and or the time period to the wireless terminal in one or more of a synchronisation signal, a system information broadcast signal a master information broadcast signal, or a message carried by a common or dedicated control channel.

In a seventh embodiment a method for controlling access to a radio network node in a telecommunications system is provided, the method comprising one or more radio network nodes and a plurality of wireless terminals, the method comprising obtaining an indication of access barring for a radio network node, wherein the access barring is based on a radio resource usage of a wireless terminal, determining the radio resource usage of the wireless terminal, and causing the wireless terminal to perform a delay in proceeding with a radio network access procedure with the radio network node, based on the indication of access barring and the determined radio resource usage of the wireless terminal.

In an eighth embodiment a computer program is provided, comprising instructions which, when executed on at least one processor, cause the at least one processor to carry out the method according to any one of the methods described herein.

BRIEF DESCRIPTION OF THE DRAWINGS

The foregoing will be apparent from the following more detailed description of example embodiments as illustrated in the accompanying drawings.

FIG. 9 illustrates an example apparatus for a wireless terminal adapted to the embodiments disclosed herein;

FIG. 10 illustrates an example apparatus for a radio network node adapted to the embodiments disclosed herein;

DETAILED DESCRIPTION

Figure 1:
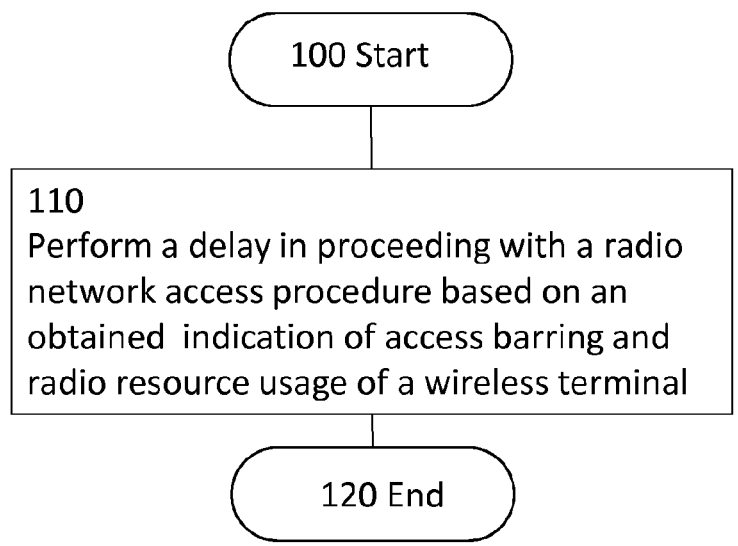
FIG. 1 illustrates an example embodiment of a method in a wireless terminal.

The methods and apparatus disclosed herein provide an improvement to access class barring with specific consideration to radio resource consumption thereby alleviating potential congestion in a cell with user equipment which may perform blind repetitions, repetitions, or re-transmission of transmissions to a radio network node.

There can be multiple reasons for using blind repetitions, for example, that devices are deployed in challenging conditions (for example in the basement of buildings), devices being of small form factors, or of ultra-low cost that cause the radio properties of the device to be sub-optimum (e.g. using small non-ideal antennas), or for example that devices use a lower output power to access the network. A NB-IoT device in extended coverage may, for example, use 128 repetitions under extreme radio conditions to access the system on the NB-IoT Physical Random Access Channel (NPRACH), i.e. the physical channel used to make an initial system access. For a device in normal radio coverage it may on the other hand be sufficient to send a single NPRACH instance to access the system. EAB does not take this factor into account when barring UEs to avoid congestion of the radio interface.

For some channels, a disproportionate amount of resources may be alleviated/removed by not scheduling the users that use blind repetitions. This is however not possible at system access where the network has no control over which devices access the network and no knowledge relating to their coverage level and/or what amount of network resources they might use. Furthermore, even in the case of using scheduling to prevent devices from using network resources, it is not a preferred solution since these devices will still consume (a disproportionate amount of) resources on the random access channel/control channel before the network can control the scheduled dedicated resources.

Improved Access Control

For NB-IoT and eMTC examples consider improvements targeting congestion control for system access. Both the NB-IoT and eMTC radio interfaces for system access is fragmented in different (N)PRACH radio resources for UEs from different coverage enhancement (CE) levels. The access class based congestion control do however apply across all CE levels, and is in that sense not suitable to combat a situation where congestion occurs in one isolated CE level appears. A barring mechanism that take the configuration of the radio interface into account may improve the situation.

For the NB-IoT and eMTC 3GPP, e.g. Release 15 further Enhancements of NB-IoT and eMTC, it is beneficial to specify improved congestion control taking the specifics of the radio interface into consideration.

Means to bar/reject a network access for a wireless terminal based on the radio coverage level of a wireless terminal and the expected resource usage of the wireless terminal in the network in relation to its coverage level is therefore beneficial. The barring/rejection functionality may be dynamic in the sense that in case of network congestion the barring can be activated, while in more lightly loaded network scenarios, it can be deactivated. A wireless terminal delays proceeding with a radio network access procedure, such as a random access, based on an obtained indication of access barring, wherein the access barring is based on the radio resource usage of the wireless terminal.

A radio network access procedure is, for example, the transmission of an uplink signal towards a radio network node which relates to the initial access of the wireless terminal with a radio network. In some examples this is a procedure performed in IDLE mode. In some examples the procedure comprises synchronisation with the radio network node. In other examples the procedure is performed after synchronisation with the radio network node. In some examples the radio network node is a base station such as an LTE eNode B. In other examples the radio network node may be another wireless terminal for example operating in a device to device scenario.

One advantage provided is that barring of wireless terminals using more resources per transmit opportunity, e.g. users in extended coverage, will release a significant amount of radio resources. The net result is that less wireless terminals may need to be barred since the radio network node can be more selective through barring based on wireless terminal coverage class or transmission mode (and therefore resource consumption) to resolve a radio network congestion scenario.

Radio Resource Usage

The resource usage of the wireless terminal is directly linked to its radio coverage level. The resource usage may be its radio resource consumption, for example how many blind repetitions, repetitions or HARQ retransmission it will perform. In other examples the resource usage may be related to its power consumption. Lower power wireless terminals can require more signalling resources, which may include blind repetitions, repetitions or HARQ retransmission, due to the transmissions occurring at a lower power.

A coverage extension (CE) level may be described as a coverage mode or coverage class. The coverage extension level can be related to the absolute coupling loss of a device. In some examples there is a direct relation between the coverage extension level and the amount of resources consumed by a device. Depending on the system (EC-GSM-IoT, NB-IoT or LTE) different terms for the coverage extension level are used and also different numbers of levels may be defined. In some examples extended coverage class includes extended coverage levels and extreme coverage class levels. In the LTE specifications a coverage class can be said to map to a Coverage Extension (CE) level. In some examples there is a plurality of coverage extension or coverage class levels, each representing a number of blind repetitions, repetitions, or re-transmission of transmissions.

In some examples the radio resource usage is dependent on a specific transmission mode used by the terminal, where one transmission mode differs from other transmission modes by the amount of resources consumed in the network. For example extended coverage, or coverage class, can be a transmission mode.

Another transmission mode could be the power class, for example reduced power class, or reduced power mode.

The coverage level or coverage class may be determined by the wireless terminal. In some examples the wireless terminal reads a set of signal level and/or quality thresholds broadcast by the radio network node that allows the UE to deduce its coverage level. In some examples said broadcast signal levels and/or thresholds are broadcast by the serving radio network node (serving cell) which are received by the wireless terminal after synchronising with the radio network node.

In some examples the wireless terminal is triggered by higher layers to perform an action, e.g. a mobile originated (MO) access, wake up and synchronize in time and frequency to the radio network node. The wireless terminal may then estimate the downlink signal strength, and/or quality, to establish that the camped on cell is suitable before reading the broadcast signal levels and/or thresholds to determine the coverage level/coverage class.

Indication of Access Barring

The indication of access barring is a resource based access barring indication, i.e. based on the radio resource usage of a wireless terminal. In one example the indication is a resource based access barring flag, e.g. Resource based Access Class Barring (RACB) flag. When the RACB flag is set, wireless terminals in an extended coverage mode are barred from connecting to the radio network node. A wireless terminal receiving the RACB flag delays proceeding with a radio network access procedure, for example performing a random access procedure. The delay may be for a period of time or until the RACB flag is received with the flag turned off. Toggling the flag on and off in time by the radio network node provides barring of a distinct fraction of all access attempts from UEs in extended coverage.

In other examples the indication comprises a resource based access barring bitmap, e.g. Resource based Access Class Barring (RACB) bitmap, where each bit relates to a certain resource based access class. When a bit in the bitmap is set this indicates that a particular resource based access class is barred. The wireless terminal is configured with a Resource based Access Class and if the bit associated with the Resource based Access Class configured for the wireless terminal, is set, then the wireless terminal shall perform a delay in proceeding with a radio network access procedure. In some examples the RACB bit map is only read by a wireless terminal requiring a higher amount of resources, e.g. due to being in extended coverage, and hence using blind repetitions, before attempting a system access.

In further examples, several RACB bit maps may be signalled, for example broadcasted in the system information. Each bitmap may be applicable to a certain pre-defined resource usage, e.g. coverage extension level.

In an another example, the flag or flags mentioned above are used without the use of a specific RACB/EAB bitmap.

That is, a code point/bit combination, bit or flag is used to indicate that a specific coverage class is not allowed to access the network. This can be referred to as a Resource Barring Bitmap (RBB). Any wireless terminal belonging to a signaled coverage class in the RBB will not be allowed to access the network.

Signalling of the Indication of Access Barring

In some examples the indication of access barring, which is a resource based access barring, is signalled in system information, or another broadcast message. The broadcast message may be a radio resource control (RRC) protocol message. Depending on the system in use different system information messages apply, for example an Extended Coverage system information (EC-SI) message for EC-GSM-IoT, a LTE SI message for eMTC and other LTE features or a system information Narrow Band (SI-NB) message for NB-IoT.

In another example the signaling of the indication of access barring, or a change of the same, is performed using a synchronization channel (SCH), for example the EC-SCH for EC-GSM-IoT, the LTE Primary Synchronization Signal (PSS) or Secondary Synchronization Signal (SSS) for eMTC and other LTE features or the NB Primary Synchronization Signal (NPSS) or the NB Secondary Synchronization Signal (NSSS) for NB-IoT.

In another example the signaling of the RACB bitmap, or a change of the same, is performed using a master information block (MIB) message, i.e. the MIB for LTE or the MIB-NB for NB-IoT.

In another example the signaling of the indication of access barring, or a change of the same, is performed using a message carried by a common or dedicated control channel, i.e. the EC-Common Control CHannel (EC-CCCH) for EC-GSM-IoT, the Physical Downlink Control CHannel (PDCCH) for LTE, or a version thereof, the MTC Physical Downlink Control CHannel (MPDCCH) for eMTC or the Narrowband Physical Downlink Control CHannel (NPDCCH) for NB-IoT.

In a further example the signaling of the indication of access barring, or a change of the same, is performed using a combination of the aforementioned signalling options.

In a first step, a synchronization channel or the master information block may be used to indicate to the UE a change in the access barring. In a second step the UE reads the master information or the system information to acquire the latest status of the resource based access barring.

The bits communicating the barring information can be placed for example in the above mentioned System Information, master information. For a more dynamic control of the barring mechanism, the barring information can be placed it in the synchronization channel, common control channel, another channel monitored by the wireless terminal, or a new channel that the wireless terminal is requested to monitor and decode before attempting system access. The system information typically does not have the property that a wireless terminal always has to decode it prior to system access, but instead that it can be less frequently acquired by the terminal (in order to minimize system delay and improve wireless terminal energy consumption).

With a dynamic barring mechanism the bitmap of coverage class barring (e.g. RACB, RBB) can also be toggled by the network so that it is active for example 15% of the time, and hence 15% of the wireless terminal access attempts will be barred. This provides a similar functionality as using the access barring bitmap, but that only the bitmap of coverage class barring needs to be signaled by the network. The wireless terminals are instead randomly barred depending on their coverage class and when they are attempting to access the network instead of being barred due to belonging to a certain access class.

Delay in Proceeding With Radio Network Access Procedure

When a barring situation has occurred, in order to limit the energy consumption in the wireless terminal, a timer may be implemented. In some examples the timer value is predefined. In other examples the timer is signalled in e.g. system information or directly to the wireless terminal, e.g. in a radio resource control (RRC) message. The wireless terminal may return to a sleep mode until the timer expires and then the system access can be attempted again. In some examples the timer is set to a progressively longer period if system access is denied in consecutive access attempts. In some examples the timer value is determined randomly either by the wireless terminal or by the radio network node (and therefore transmitted to the wireless terminal). In some examples the value is provided in a pre-defined time window. By selecting a randomly generated time period if many wireless terminals are attempting to access the radio network at similar times and are denied access due to resource based access barring then these wireless terminals will have a randomly distributed delay before they try again to access the system.

Low Power Devices

NB-IoT, EC-GSM-IoT and LTE systems all support wireless terminals of different output power classes. Wireless terminals with a low maximum output power can end up earlier in extended coverage due to their weak uplink. In some examples separate barring conditions for wireless terminals of low power class are implemented. Such mechanisms can be realized through the indication of access barring as described above, wherein the indication corresponds to a wireless terminal supporting low output power. In some examples the low power modes or classes correspond to one or more transmission modes, wherein the indication of access barring corresponds to a transmission mode which is barred.

Detailed Examples According to Drawings

Referring now in detail to the drawings, illustrated in FIG. 1 a method in a wireless terminal is provided, starting at 100, wherein the wireless terminal, at 110, performs a delay in proceeding with a radio network access procedure based on an obtained indication of access barring. The indication of access barring is based on the radio resource usage of the wireless terminal.

The radio network access procedure, in some examples, is a random access procedure wherein the wireless terminal connects to the radio network node to transmit or receive data.

The indication of access barring may be a resource based access barring flag indicating that wireless terminals requiring higher amounts of resources (e.g. due to performing blind repetitions) are barred from performing a radio network access procedure. The indication may alternatively be a radio resource based access barring bitmap wherein, for example, the bitmap corresponds to a predefined or preconfigured resource based access barring class in the wireless terminal. In other examples the indication comprises a coverage class level which corresponds to one of a number of coverage classes. The coverage classes may be determined by the wireless terminal. In some examples the indication comprises a transmission mode of the wireless terminal, for example a coverage mode or a power mode. It should be appreciated from the description that the indication of access barring may comprise a combination of the above disclosed techniques. The method ends at 120.

Figure 2:
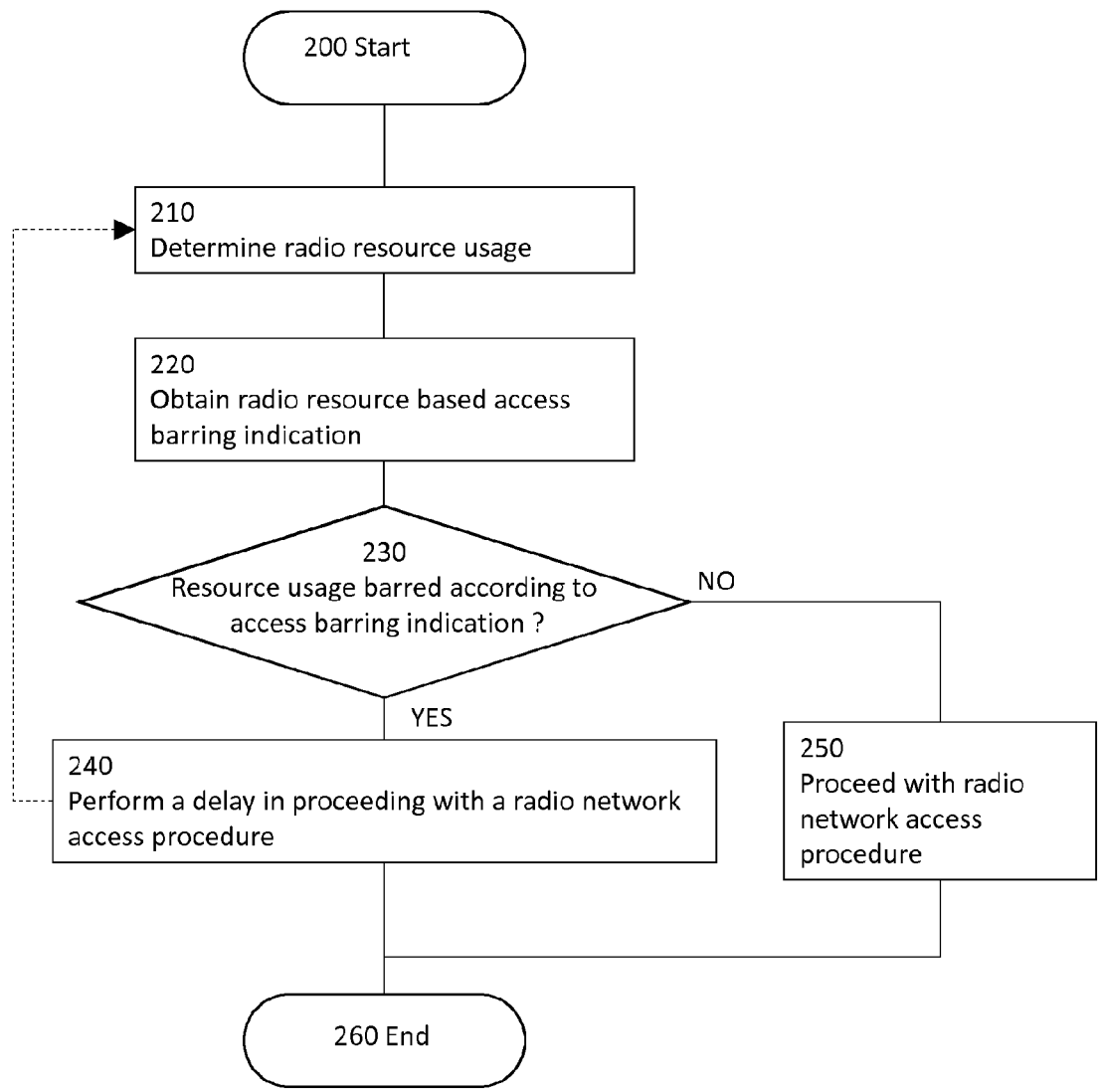
FIG. 2 illustrates a further example embodiment of a method in a wireless terminal.

In FIG. 2 a further method is depicted, starting at 200, wherein a wireless terminal first determines its radio resource usage 210, this may be derived from the specific modes of operation of the wireless terminal, for example the type of device (low power, small form factor) or it may be derived through cell measurements which determine whether the wireless terminal operates in a certain coverage class.

The wireless terminal obtains 220 an indication of resource based access barring. The indication may comprise one or more of a resource based access barring flag, a resource based access barring bitmap, a coverage class level or a transmission mode. Whilst FIG. 2 depicts the obtaining step 220 occurring after the wireless terminal has determined its radio resource usage 210, in other examples, the wireless terminal obtains the radio resource based access barring before determining its radio resource usage.

The wireless terminal then compares 230 its determined radio resource usage with the obtained resource based access barring indication. If the indication corresponds to the determined resource usage of the wireless terminal then the wireless terminal performs 240 a delay in proceeding with a radio network access procedure. If the indication does not correspond to the radio resource usage determined by the wireless terminal, i.e. the wireless terminal is not operating in a mode for which resource based access barring is set, the wireless terminal proceds with performing 250 a radio network access procedure. The method terminates at 260.

Figure 3:
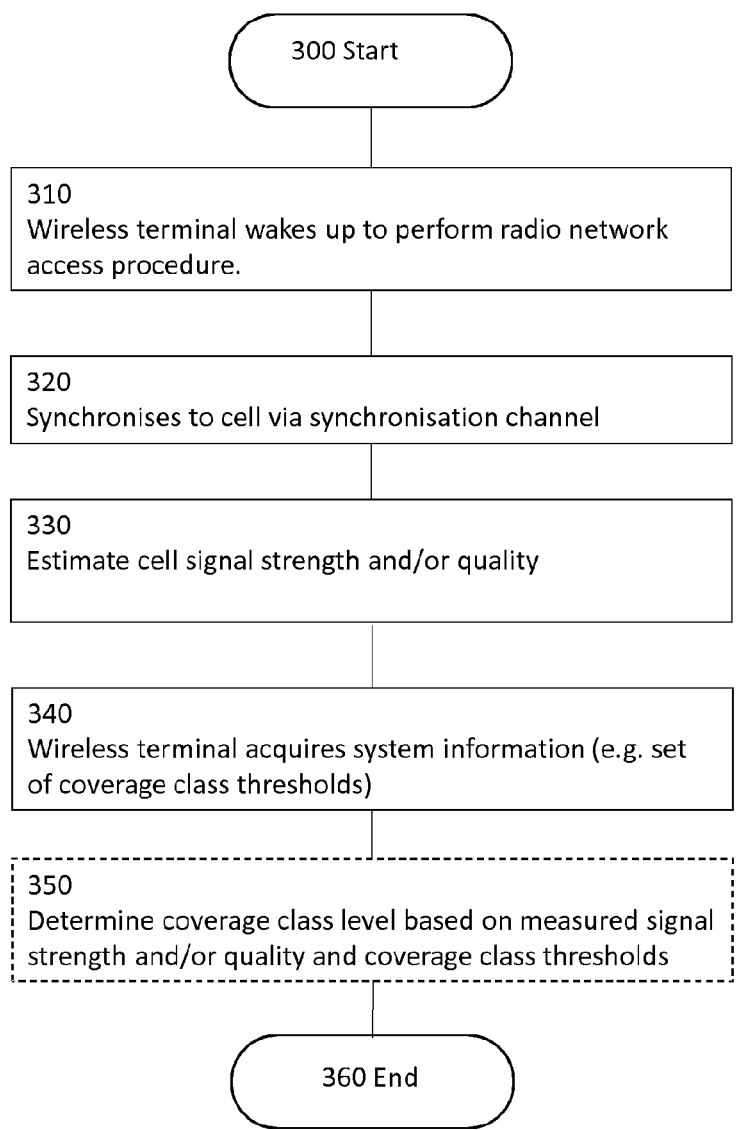
FIG. 3 illustrates a further example embodiment of a method in a wireless terminal.

FIG. 3 describes the process for a wireless terminal determining its radio resource usage. The method starts at 300 and, in this example, the wireless terminal is in a sleep mode. The wireless terminal wakes 310 to perform a radio network access procedure. In some examples the wireless terminal is triggered by higher layers to perform an action, e.g. a mobile originated (MO) access.

The wireless terminal synchronises to a cell 320. In some examples this comprises synchronizing in time and frequency to the radio access network, in particular that of the radio network node serving the cell detected by the wireless terminal.

The wireless terminal estimates 330 the downlink signal strength, and/or quality, to establish that the camped on cell is suitable for the wireless terminal to communicate with. If this is the case the wireless terminal acquires 340 the broadcasted system information and reads a set of signal level and/or quality thresholds.

The wireless terminal then determines 350 its radio resource usage, for example, its coverage class level based on the measured signal strength and/or quality and the obtained coverage class thresholds from the system information. The method terminates at 360.

Figure 4:
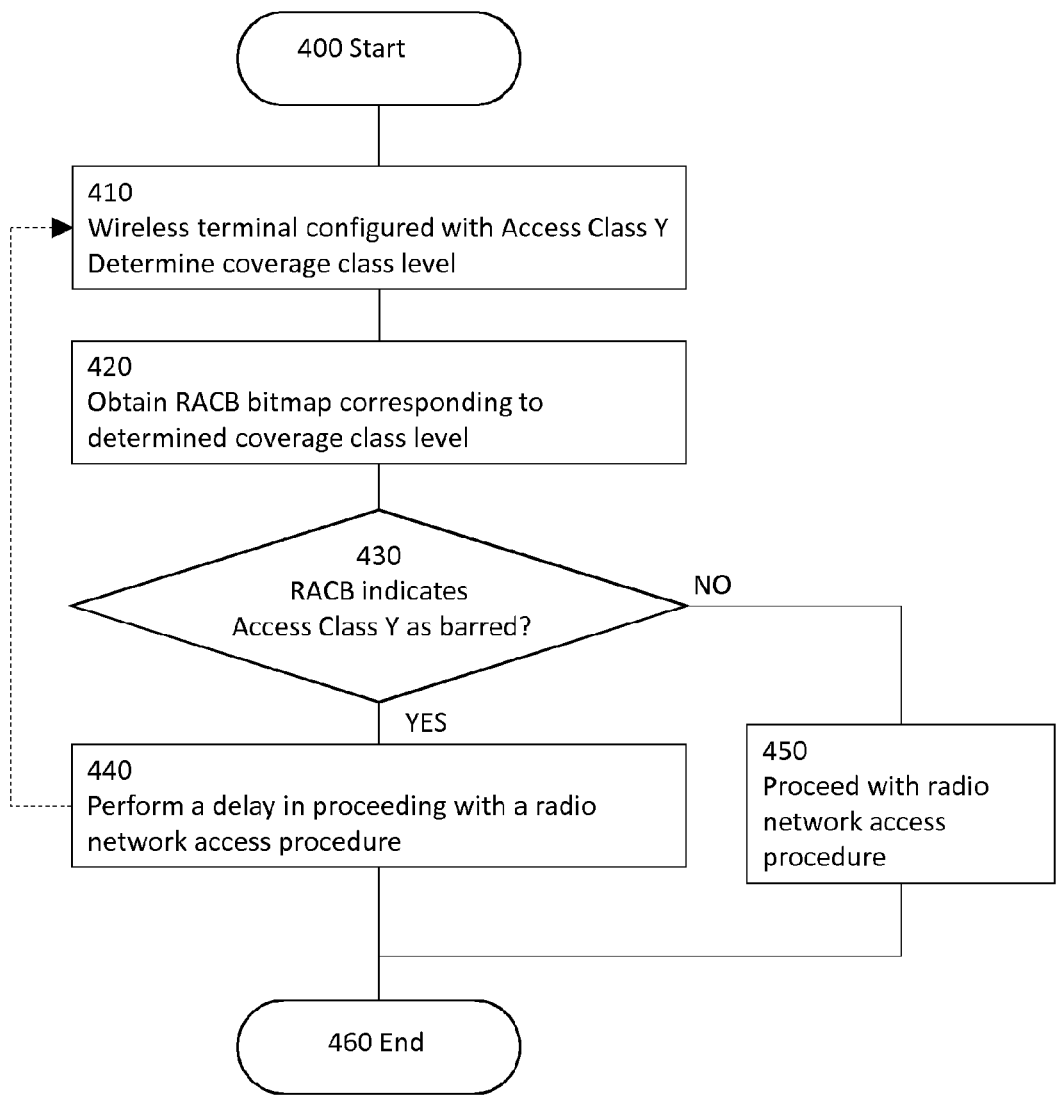
FIG. 4 illustrates a further example embodiment of a method in a wireless terminal.

In FIG. 4 an embodiment of the disclosure is provided for determining the resource based barring, based on a resource based access barring bitmap. The process begins at 400, wherein a wireless terminal is configured with an Access Class value (e.g. value Y), for example, the Extended Access-class Barring (EAB) access class. The wireless terminal determines 410 its radio resource usage, for example a coverage class/level. In some examples the wireless terminal determines its coverage class/level as described in FIG. 3.

The wireless terminal obtains 420 an indication of resource based access barring, this step corresponds to step 220 in FIG. 2. The wireless terminal selects and reads the RACB bitmap that is associated with its coverage level 430. If the RACB bitmap indicates that one or more Access classes are barred then the wireless terminal compares its own access class with the barred access classes to determine if the wireless terminal is barred from system access.

If the wireless terminal is barred (e.g. Access Class Y is barred) from system access, the wireless terminal performs 440 a delay in proceeding with a radio network access procedure. If the wireless terminal is not barred the wireless terminal proceeds with performing 450 a radio network access procedure. The method terminates at 460.

Figure 5:
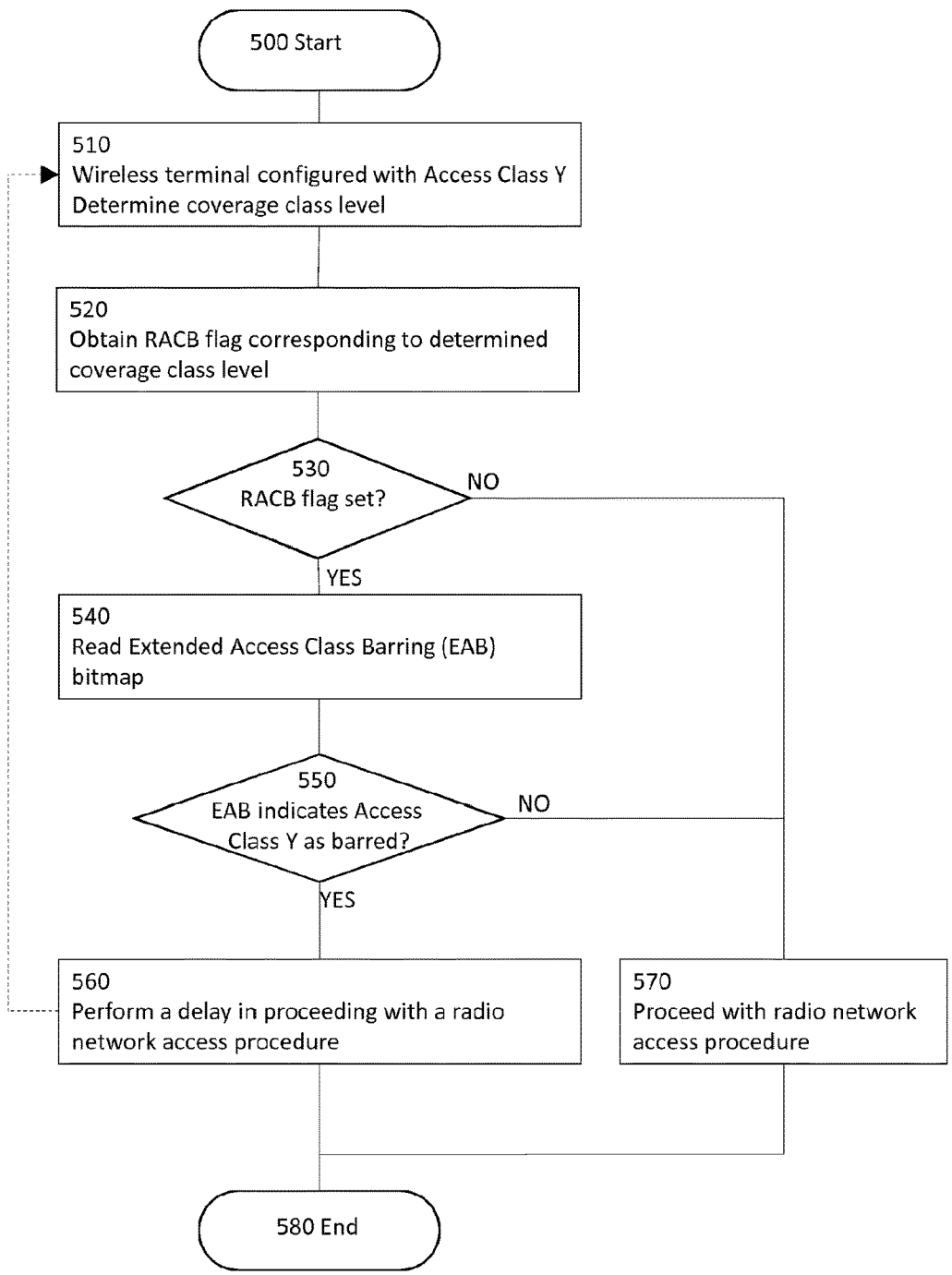
FIG. 5 illustrates a further example embodiment of a method in a wireless terminal.

In FIG. 5, starting at 500, an embodiment of the disclosure is provided for determining the resource based barring, based on a resource based access barring flag. The wireless terminal is configured with an access class, e.g. EAB class as described above and the wireless terminal determines 510 its coverage class, for example, as described previously.

The wireless terminal obtains 520 an indication of resource based access barring, this step corresponds to step 220 in FIG. 2. In this embodiment, the indication comprises a RACB flag. If the flag is set, all wireless terminals requiring a higher level of resources, e.g. due to being in extended coverage, and which are supporting RACB and EAB, should read the EAB bitmap to determine if they are barred before attempting a system access. The flag could be, in its simplest form, a single bit. In other embodiments the indication of access barring could be composed of more code points where each code points determines if wireless terminals in a certain coverage class, or a combination of coverage classes, should read the EAB bit map.

The wireless terminal then examines the RACB flag, e.g. for its determined coverage class 530. If the respective RACB flag is set then the wireless terminal reads the EAB bitmap values and compares this with its EAB class value 550. If the EAB class (e.g. class Y) is set then the wireless terminal is barred from system access and performs 560 a delay in proceeding with a radio network access procedure. If the wireless terminal is not barred the wireless terminal proceeds with performing 570 a radio network access procedure. The method terminates at 580.

Figure 6:
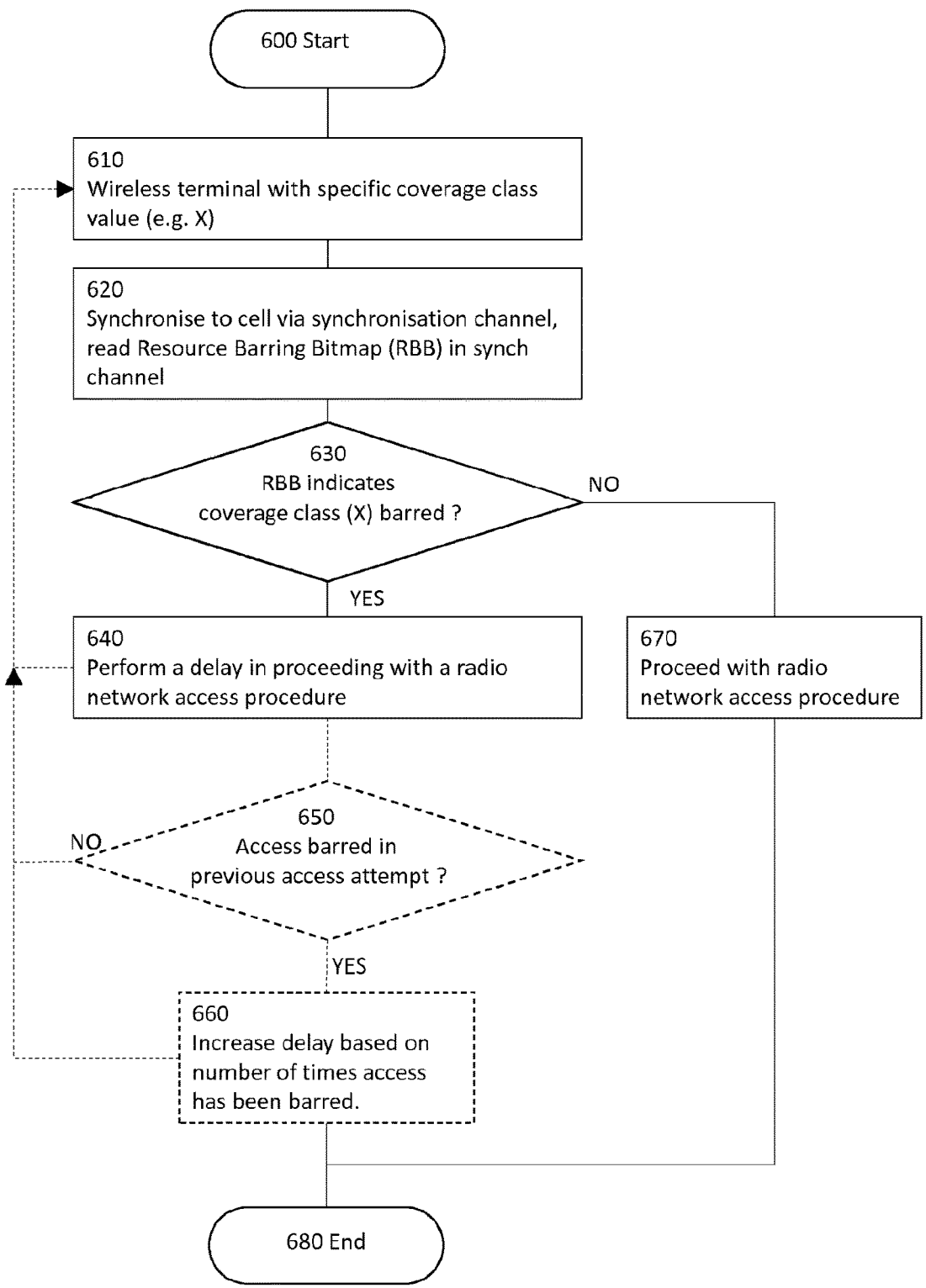
FIG. 6 illustrates a further example embodiment of a method in a wireless terminal.

In FIG. 6 an embodiment is depicted wherein the wireless terminal determines the resource based access barring during the synchronisation phase. The process begins at 600 and applies to a wireless terminal with a specific coverage class (e.g. coverage class X), the coverage class may be preconfigured or determined by its mode of operation, e.g. power level 610.

The wireless terminal synchronises 620 to a cell via the synchronisation channel and reads indication of access barring, for example the Resource Barring Bitmap (RBB), which is signalled in the synchronisation channel. The wireless terminal then checks if the coverage class to which it belongs (e.g. class X) is set, according to the RBB 630. If the bit in the RBB corresponding to the coverage class of the wireless terminal is set then the wireless terminal is barred from system access and performs 640 a delay in proceeding with a radio network access procedure. If the wireless terminal is not barred the wireless terminal proceeds with performing 670 a radio network access procedure.

Optionally the wireless terminal may determine the duration in which it delays proceeding with a radio network access procedure based on previous access attempts 650. If the wireless terminal has previously attempted to perform a radio network access procedure in which it has been barred from system access the delay period is increased 660. In some examples the duration of the delay is proportional to the number of failed access attempts. The process ends at 680.

Figure 7:
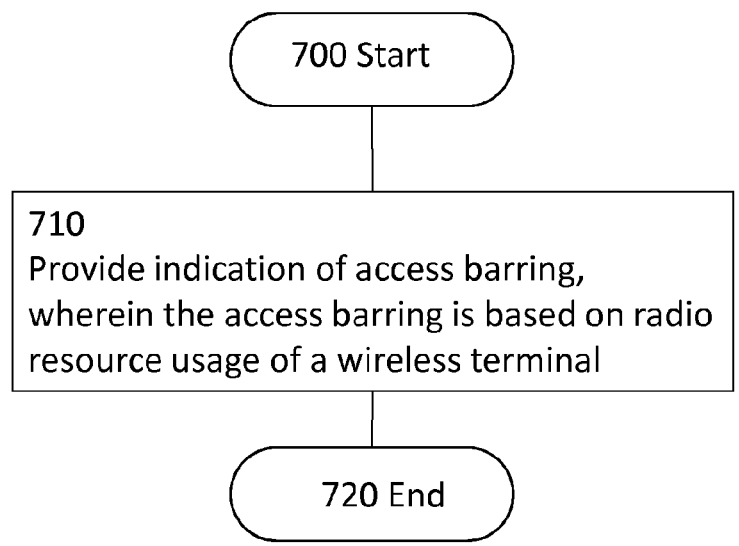
FIG. 7 illustrates an example embodiment of a method in a radio network node.

In FIG. 7 an embodiment is provided for a method in a radio network node, starting at 700. The radio network node provides 710 an indication of access barring, wherein the access barring is based on a radio resource usage of a wireless terminal. The radio network access procedure, in some examples, is a random access procedure wherein the wireless terminal connects to the radio network node to transmit or receive data.

The indication of access barring may be a resource based access barring flag indicating that wireless terminals requiring higher amounts of resources (e.g. due to performing blind repetitions) are barred from performing a radio network access procedure. The indication may alternatively be a radio resource based access barring bitmap wherein, the bitmap corresponds to a predefined or preconfigured resource based access barring class in the wireless terminal. In other examples the indication comprises a coverage class level which corresponds to one of a number of coverage classes which may be determined by the wireless terminal. In some examples the indication comprises a transmission mode of the wireless terminal, for example a coverage mode or a power mode. It should be appreciated from the description that the indication of access barring may comprise a combination of the above disclosed techniques.

The radio network node may signal the indication of access barring to the wireless terminal. The type of signal used may depend on the system in which the method is deployed. In some examples the indication is provided in a synchronisation signal. In other examples the indication is provided in a system information broadcast or a master information broadcast. In further examples the indication is provided in a message carried by a common or dedicated control channel. In some examples the indication is provided in a plurality of the above mentioned signalling means and or other signalling mechanisms which achieve the same result.

In some examples the radio network node provides a time period for which the wireless terminal shall delay proceeding with a radio network access procedure. In some examples the time period is randomly generated to provide a random distribution of the time in which wireless terminals retry performing a radio network access procedure. The procedure ends at 720.

Figure 8:
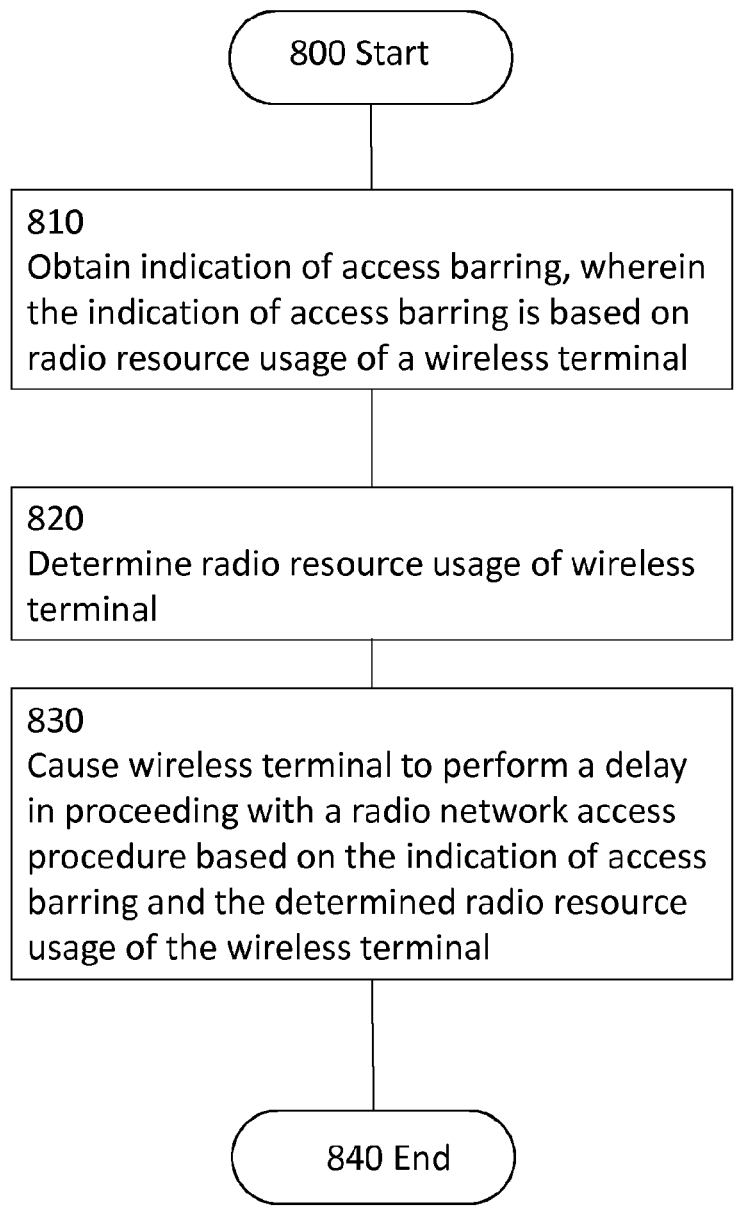
FIG. 8 illustrates an example embodiment of a method in a telecommunications system.

FIG. 8 depicts an embodiment for a method in a system for controlling access to a radio network node in a telecommunications system. The procedure begins at 800, wherein the system comprises one or more radio network nodes and a plurality of wireless terminals. The system obtains in 810 an indication of access barring for a radio network node, wherein the indication of access barring is based on the radio resource usage of a wireless terminal.

At 820 the system determines the radio resource usage of a wireless terminal. This may be achieved by the wireless terminal in question as described above. In other examples this may be configured or determined by the mode of the terminal, for example its power class or transmission mode and therefore known or obtained by the system. Whilst FIG. 8 depicts the obtaining step 810 occurring before the step of determining the radio resource usage of a wireless terminal 820, in other examples, the system obtains the radio resource based access barring after determining the radio resource usage of a wireless terminal.

At 830 the system causes the wireless terminal to perform a delay in proceeding with a radio network access procedure with the radio network node, based on the indication of access barring and the determined radio resource usage of the wireless terminal. For example the system may communicate with the wireless terminal via a management layer protocol such as LWM2M. The process ends at 840.

FIG. 9 depicts a wireless terminal 900 configured to perform one or more of the methods disclosed herein. In particular the wireless terminal is configured to delay proceeding with a radio network access procedure based on an obtained indication of access barring, wherein the access barring is based on a radio resource usage of the wireless terminal. The radio network access procedure, in some examples, is a random access procedure wherein the wireless terminal connects to the radio network node to transmit or receive data.

The indication of access barring may be a resource based access barring flag indicating that wireless terminals requiring higher amounts of resources (e.g. due to performing blind repetitions) are barred from performing a radio network access procedure. The indication may alternatively be a radio resource based access barring bitmap wherein, for example, the bitmap corresponds to a predefined or preconfigured resource based access barring class in the wireless terminal. In other examples the indication comprises a coverage class level which corresponds to one of a number of coverage classes. In some examples the indication comprises a transmission mode of the wireless terminal, for example a coverage mode or a power mode. It should be appreciated from the description that the indication of access barring may comprise a combination of the above disclosed techniques.

In some examples the wireless terminal 900 is further configured to determine the radio resource usage based on estimated cell signal strength and/or quality and radio resource usage thresholds. In some examples the wireless terminal is configured with an Extended Access-class Barring (EAB) value and the indication of access barring indicates, for a given radio resource usage indication, an Extended Access-class Barring (EAB) value for which resource based access barring applies. In other examples the wireless terminal is configured to perform a delay in proceeding with a radio network access procedure until a specified time period has elapsed, wherein the specified time period is based either on a random period or derived from a number of consecutive access attempts.

FIG. 10 depicts a radio network node 1000 configured to perform one or more of the methods disclosed herein. In particular, the radio network node 1000 is configured to provide an indication of access barring for a radio network node, wherein the access barring is based on the radio resource usage of a wireless terminal. The radio network access procedure, in some examples, is a random access procedure wherein the wireless terminal connects to the radio network node to transmit or receive data.

The indication of access barring may be a resource based access barring flag indicating that wireless terminals requiring higher amounts of resources (e.g. due to performing blind repetitions) are barred from performing a radio network access procedure. The indication may alternatively be a radio resource based access barring bitmap wherein, for example, the bitmap corresponds to a predefined or preconfigured resource based access barring class in the wireless terminal. In other examples the indication comprises a coverage class level which corresponds to one of a number of coverage classes which may be determined by the wireless terminal. In some examples the indication comprises a transmission mode of the wireless terminal, for example a coverage mode or a power mode, or a combination of the two. It should be appreciated from the description that the indication of access barring may comprise a combination of the above disclosed techniques.

The radio network node 1000 may be configured to signal the indication of access barring to the wireless terminal. The type of signal used may depend on the system in which the method is deployed. In some examples the indication is provided in a synchronisation signal. In other examples the indication is provided in a system information broadcast or a master information broadcast. In further examples the indication is provided in a message carried by a common or dedicated control channel. In some examples the indication is provided in a plurality of the above mentioned signalling means and or other signalling mechanisms which achieve the same result.

In some examples the radio network node 1000 is configured to provide a time period for which the wireless terminal shall delay proceeding with a radio network access procedure. In some examples the time period is randomly generated to provide a random distribution of the time in which wireless terminals retry performing a radio network access procedure.

Figure 11:
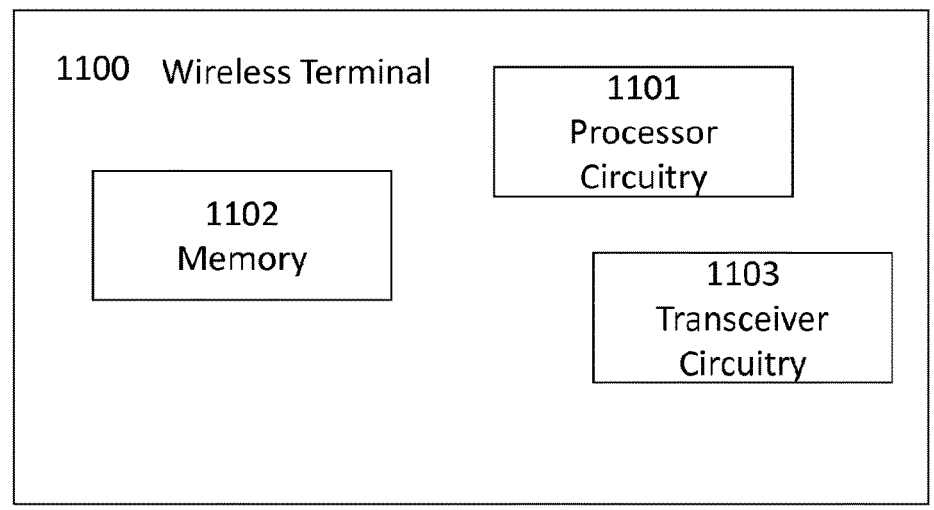
FIG. 11 illustrates a further example apparatus for a wireless terminal adapted to the embodiments disclosed herein.

FIG. 11 depicts a further example of a wireless terminal 1100 comprising processor circuitry 1101, a memory 1102 and transceiver circuitry 1103, said memory containing instructions executable by said processor circuitry wherein the instructions enable the wireless terminal to perform one or more of the methods disclosed herein. The transceiver circuitry 1103 comprises the components necessary for communication with one or more radio network nodes. To that end it may include any number of transceiving, receiving, and/or transmitting units or circuitry. It should further be appreciated that the transceiver circuitry 1103 may be in the form of any input/output communications port known in the art and may comprise RF circuitry and baseband processing circuitry.

The memory 1102 stores instructions, in the form of a computer program, for causing the processor circuitry 1101 to carry out the steps described herein. The computer program may be installed in the memory 1102 prior to the wireless terminal being put into operation or alternatively be downloaded subsequently as a separate application. The memory 1102 may be configured to store received or transmitted data and/or executable program instructions as well as any form of barring classes, transmission modes or power classes, reference signals, and/or measurement data or information. The memory 1102 may be any suitable type of computer readable memory and may be of volatile and/or non-volatile type. The processor circuitry 1102 may include any suitable type of computation unit, e.g. a microprocessor, digital signal processor (DSP), field programmable gate array (FPGA), or application specific integrated circuit (ASIC) or any other form of circuitry. It should be appreciated that the processor circuitry 1102 need not be provided as a single unit but may be provided as any number of units.

In a particular embodiment the wireless terminal 1100 is operative to receive, via said transceiver circuitry 1103 an indication of access barring for a radio network node, wherein the barring is based on the radio resource usage of a wireless terminal. The processor circuitry 1102 is configured to determine the radio resource usage of the wireless terminal and perform a delay in proceeding with a radio network access procedure with the radio network node based on the indication of access barring and the determined radio resource usage.

Figure 12:
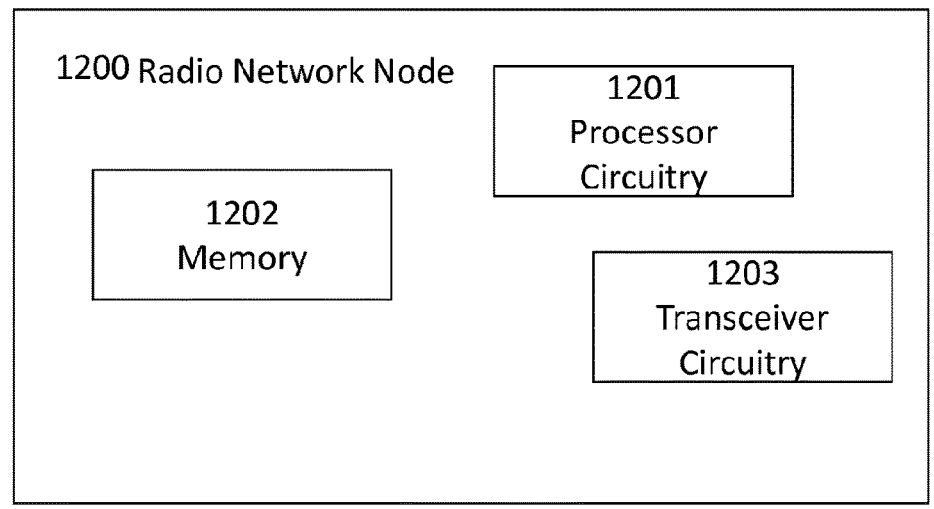
FIG. 12 illustrates a further example apparatus for a radio network node adapted to the embodiments disclosed herein.

FIG. 12 depicts a further example of a radio network 1200 comprising processor circuitry 1201, a memory 1202 and transceiver circuitry 1203, said memory containing instructions executable by said processor circuitry 1201 wherein the instructions enable the radio network node to perform one or more of the methods disclosed herein. The transceiver circuitry 1103 comprises the components necessary for communication with a plurality of wireless terminals and one or more radio network nodes. To that end it may include any number of transceiving, receiving, and/or transmitting units or circuitry. It should further be appreciated that the transceiver circuitry 1103 may be in the form of any input/output communications port known in the art and may comprise RF circuitry and baseband processing circuitry.

The memory 1202 stores instructions, in the form of a computer program, for causing the processor circuitry 1201 to carry out the steps described herein. The computer program may be installed in the memory 1202 prior to the radio network node being put into operation or alternatively be downloaded subsequently as a separate application. The memory 1202 may be configured to store received or transmitted data and/or executable program instructions as well as any form of barring classes, system information, reference signals, and/or measurement data or information. The memory 1202 may be any suitable type of computer readable memory and may be of volatile and/or non-volatile type. The processor circuitry 1202 may include any suitable type of computation unit, e.g. a microprocessor, digital signal processor (DSP), field programmable gate array (FPGA), or application specific integrated circuit (ASIC) or any other form of circuitry. It should be appreciated that the processor circuitry 1202 need not be provided as a single unit but may be provided as any number of units.

In a particular embodiment radio network node 1200 is operative to provide, via the transceiver circuitry 1203, an indication of access barring for a radio network node, wherein the barring is based on the radio resource usage of a wireless terminal.

In some embodiments the wireless terminal comprises a delay module for performing a delay in proceeding with a radio network access procedure with the radio network node based on the indication of access barring and the determined radio resource usage. In further examples the wireless terminal comprises a determining module for determining a radio resource usage of the wireless terminal according to the methods described herein. In further examples the wireless terminal comprises a determining module for determining the resource based access barring, through one or more of the methods described herein.

In further examples the wireless terminal comprises an obtaining module for obtaining the indication of access barring, wherein the indication is based on the radio resource usage of a wireless terminal.

In some examples the radio network node comprises a providing module for providing the indication of access barring, wherein the indication is based on the radio resource usage of a wireless terminal.

In this detailed description, numerous specific details are set forth in order to provide a thorough understanding of the embodiments of the invention. It will be understood by those skilled in the art, however, that the embodiments of the invention may be practiced without these specific details. In other instances, well known methods, procedures, components and circuits have not been described in detail so as not to obscure the embodiments of the invention. It can be appreciated that the specific structural and functional details disclosed herein may be representative and do not necessarily limit the scope of the invention.

In one embodiment a computer program is provided, comprising instructions which, when executed on at least one processor, cause the at least one processor to carry out the method according to any one of the methods described herein. An embodiment of the invention may include functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor.

Alternatively, an embodiment of the invention may be implemented as specific hardware components that contain hard-wired logic for performing the recited functionality, or by any combination of programmed general-purpose computer components and custom hardware components.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

Abbreviations
CE Coverage Extension
EAB Extended Access class Barring
EC-GSM-IoT Extended Coverage GSM for Internet of Things
eMTC LTE enhancements for Machine Type Communication
LWM2M Light Weight Machine to Machine
RACB Resource based Access Class Barring
RBB Resource Barring Bitmap

The invention claimed is:

1. A method in a wireless terminal for performing a radio network access procedure, the method comprising:
performing a delay in proceeding with a radio network access procedure based on an obtained indication of access barring, wherein the access barring is based on a radio control signaling resource usage of the wireless terminal operating in extended radio coverage, and wherein the indication of access barring comprises a coverage class level and/or coverage mode or a power mode associated with the extended coverage.

2. The method of claim 1, wherein the radio resource usage comprises the wireless access terminal performing blind repetitions, repetitions, or re-transmission of transmissions to a radio network node.

3. The method of claim 1, wherein the wireless terminal determines the coverage class level based on measured cell signal strength and/or quality and a set of coverage class thresholds obtained in system information.

4. The method of claim 1, wherein the indication of access barring comprises a plurality of resource based access class barring flags or bitmaps, wherein each flag or bitmap corresponds to a radio resource usage indication and/or wherein the wireless terminal is configured with an Extended Access-class Barring (EAB) value and the indication of access barring indicates, for a given radio resource usage indication, an Extended Access-class Barring, EAB, value for which resource based access barring applies and/or further comprising the wireless terminal performing a delay in proceeding with a radio network access procedure until a specified time period has elapsed, wherein the specified time period is based either on a random period or derived from a number of consecutive access attempts.

5. A method in a radio network node for controlling access to the radio network node, the method comprising:
providing an indication of access barring for a radio network node, wherein the access barring is based on the radio control signaling resource usage of a wireless terminal operating in extended radio coverage, wherein the indication of access barring comprises a coverage class level and/or a coverage mode or a power mode associated with the extended radio coverage.

6. The method of claim 5 wherein providing an indication of access barring is signalled by the radio network node to the wireless terminal in one or more of:
a synchronisation signal;
a system information broadcast signal;
a master information broadcast signal; or
a message carried by a common or dedicated control channel.

7. The method of claim 5, wherein the method further comprises providing a time period in which the wireless terminal performs a delay in proceeding with a radio network access procedure, wherein the time period is randomly generated.

8. A wireless terminal comprising:
processing circuitry configured to delay proceeding with a radio network access procedure based on an obtained indication of access barring,
wherein the access barring is based on a radio control signaling resource usage of the wireless terminal operating in extended radio coverage, and
wherein the indication of access barring comprises a coverage class level and/or a coverage mode or a power mode associated with the extended radio coverage.

9. The wireless terminal of claim 8, wherein the radio resource usage comprises the wireless access terminal performing blind repetitions, repetitions, or re-transmission of transmissions to a radio network node.

10. The wireless terminal of claim 8, wherein the wireless terminal is configured to determine the coverage class based on estimated cell signal strength and/or quality and a set of coverage class thresholds obtained in system information.

11. The wireless terminal of claim 8, wherein the indication of access barring comprises a plurality of resource based access class barring flags or bitmaps, wherein each flag or bitmap corresponds to a radio resource usage indication and/or wherein the wireless terminal is configured with an Extended Access-class Barring (EAB) value and the indication of access barring indicates, for a given radio resource usage indication, an Extended Access-class Barring, EAB, value for which resource based access barring applies, and/or wherein the wireless terminal is configured to perform a delay in proceeding with a radio network access procedure until a specified time period has elapsed, wherein the specified time period is based either on a random period or derived from a number of consecutive access attempts.

12. A radio network node comprising:

processing circuitry configured to provide an indication of access barring for a radio network node, wherein the access barring is based on the radio control signaling resource usage of a wireless terminal operating in extended radio coverage, and wherein the indication of access barring comprises a coverage class level, and/or a coverage mode or a power mode associated with the extended radio coverage.

13. The radio network node of claim 12, wherein the radio network node is further configured to provide a time period in which the wireless terminal delays proceeding with a radio network access procedure, wherein the time period is randomly generated and/or signal the indication of access barring in one or more of:

a synchronisation signal;
a system information broadcast signal;
a master information broadcast signal; or
a message carried by a common or dedicated control channel.

14. A method for controlling access to a radio network node in a telecommunications system, comprising one or more radio network nodes and a plurality of wireless terminals, the method comprising:

obtaining an indication of access barring for a radio network node, wherein the access barring is based on a radio control signaling resource usage of a wireless terminal operating in extended radio coverage, and;

determining the radio resource usage of the wireless terminal; and, causing the wireless terminal to perform a delay in proceeding with a radio network access procedure with the radio network node, based on the indication of access barring and the determined radio resource usage of the wireless terminal wherein the indication of access barring comprises a coverage class level, and/or a coverage mode or a power mode associated with the extended radio coverage.

* * * * *